G. W. Robinson.
Steering.
No. 1,715.
32,719.
Patented Jul. 2, 1861.
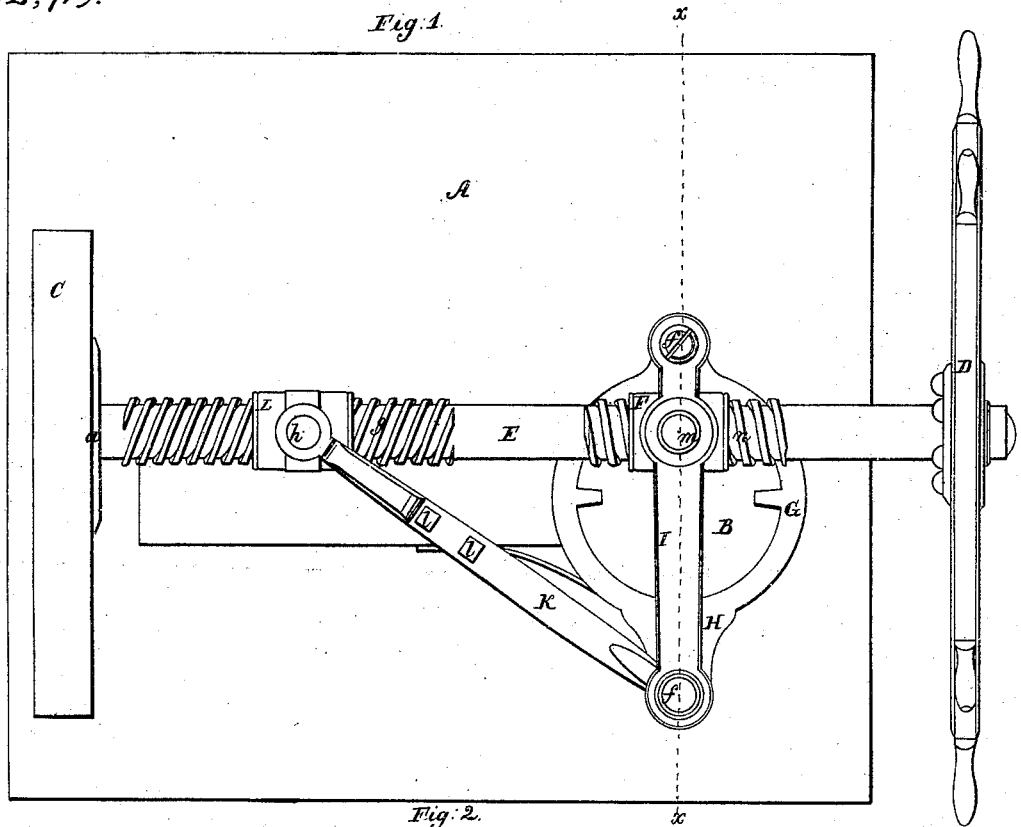
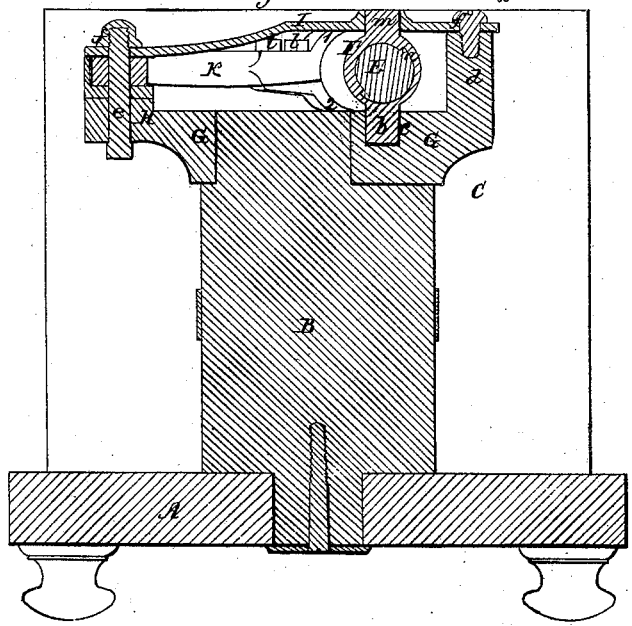
Witnesses:
W. Meyer
Thos. B. Roach
Thos. L. Glover
Inventor:
Geo. W. Robinson
by his attorney
Sam. Cooper

UNITED STATES PATENT OFFICE.

GEORGE W. ROBINSON, OF SOMERVILLE, MASSACHUSETTS.

STEERING APPARATUS.

Specification of Letters Patent No. 32,719, dated July 2, 1861.

*To all whom it may concern:*

Be it known that I, GEO. W. ROBINSON, of Somerville, in the county of Middlesex and State of Massachusetts, have invented an Improved Mechanical Steerer for Vessels, of which the following is a full, clear, and exact description, reference being had to the accompanying drawings, making part of this specification, in which—

Figure 1 is a plan of my improved steerer; Fig. 2 a transverse vertical section through the same on the line *x. x.* of Fig. 1.

The object of my present invention is to economize as much as is practicable the space occupied by the steering mechanism and at the same time to produce a cheap, durable and efficient mechanical steerer. And my invention consists in the mechanical steerer to be hereinafter described.

That others skilled in the art may understand and use my invention I will proceed to describe the manner in which I have carried out the same.

In the said drawing A. represents the deck of a vessel—B. the rudder post—C. the stern of the vessel—D. the steering wheel which is fast on the end of the shaft E., this shaft has one of its bearings at *a* in the stern C. (or when the position of the rudder post does not admit of this, then in a heavy stanchion rising from the deck). Its other bearing is in a box or nut F., a pivot *b* from the lower side of which enters and turns freely in a socket *c* set in the head of the rudder post B. A heavy metal collar G surrounds the head of the rudder post and is firmly secured thereto, it has a heavy pin *d* rising from one side of it, and from the opposite side of the collar projects an arm H, from the outer end of which rises another heavy pin *e*. A stout metal brace or cap I extends across above the rudder head, the pins *d* and *e* pass up through its two ends, and the cap is secured to them by screws or nuts *f*—this serves to stiffen and support the pin *e*. to which is pivoted one end of a connecting rod K., the other end of which is pivoted to a nut L—this nut has cut in it a female screw in which fits the screw *g*. on the shaft E. The end of the rod K. which is connected with the nut L. is forked, the arms 1 and 2 embracing at their ends pivots *h* and *i* which project one from the top and the other from the bottom side of the nut L. (for convenience of putting the ends of the arms over the pivots, one of the arms 2 is attached to the rod K. by bolts and nuts at *l*). The rod K. being connected with both sides of the nut L, prevents the nut from turning and as the shaft E is revolved by the hand wheel D. the screw *g* turning in the nut L. moves it back and forth on the shaft, and through the rod K. and arm H turns the rudder post B.

The nut F. besides its pivot *b* on the lower side has another pivot *m* on top which passes up through and turns freely in the cap I, this relieves the strain on the lower pivot. This nut has cut in it a female screw in which fits a screw *n* on the shaft E. cut counter or winding in the opposite direction to the screw *g*. As the relative distances traversed by the nuts F. and L on the shaft E will be proportionate to the relative distances of the pivots *b*. and *e* from the center of the rudder post B. the pitch of the two screws *n* and *g* will bear the same relation to each other.

The nut F. may be placed immediately over the center of the rudder post, in which case it will not be required to move longitudinally on the shaft E., when no screw *n* will be required, but the nut may be kept in place on the shaft by a collar on the shaft at each end of the nut, or the nut may be formed in two parts and grooves in the nut embrace two or more rings on the shaft. In this case the arm H. must be lengthened to obtain the requisite leverage. I prefer however to place the shaft E as shown in the drawings a little to one side of the center of the rudder post, and to make the steerer more compact. At the same time I do not consider it advisable to carry it too far to one side, as it places the helmsman, when on one side of the steering wheel, away from the middle of the vessel.

It is a great desideratum in steering apparatus of this class that the steering mechanism should be supported on the rudder post and move with it, either as it rises or is swayed back and forth by the action of the waves, or sags back by the wear of the pintles, as thereby a great strain and wear on the parts is avoided. This end is attained in the above described steerer, for the threads of the screws *n* and *g* turning counter to each other, there can be no end thrust to the shaft E., and the bearing *a* at the rear end of the shaft is only required to support the weight of the shaft and keep it in place, and does not prevent the shaft from rising at its front end or the whole apparatus from moving forward and aft with the rudder post. The same will be the effect if collars are used to confine the nut F on the shaft instead of the screw $n$, as in case the nut is over the center of the rudder post.

It will be seen that, in the apparatus invented by me there is a greater degree of simplicity attained than exists in other contrivances where, there are a greater number of pivots, as in the cases referred to, and it will be remembered that as these pivots are the most expensive and least durable parts of the apparatus, it is a great desideratum, to reduce the number of them.

I am aware that there is no novelty in the double screw operating separate links, but

What I claim as of my invention and desire to secure by Letters Patent is—

The combination of the screw shaft E, nut L, connecting rod K. arm H. and pivot box F. on the rudder head—the whole arranged to operate substantially as described for the purpose set forth.

GEO. W. ROBINSON.

Witnesses:
 JAMES MARBLE,
 W. S. ROBINSON.